United States Patent
Suzani et al.

(10) Patent No.: US 10,382,380 B1
(45) Date of Patent: Aug. 13, 2019

(54) WORKLOAD MANAGEMENT SERVICE FOR FIRST-IN FIRST-OUT QUEUES FOR NETWORK-ACCESSIBLE QUEUING AND MESSAGING SERVICES

(71) Applicant: Amazon Technologies, Inc., Seattle, WA (US)

(72) Inventors: Amin Suzani, Vancouver (CA); Jakub Wojciak, North Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 15/354,887

(22) Filed: Nov. 17, 2016

(51) Int. Cl.
 *H04L 12/58* (2006.01)
 *H04L 12/863* (2013.01)
(52) U.S. Cl.
 CPC .......... *H04L 51/30* (2013.01); *H04L 47/6245* (2013.01)
(58) Field of Classification Search
 CPC ..... H04L 51/30; H04L 47/6245; H04L 47/10; H04L 47/12; H04L 47/125; H04L 47/50; H04L 47/6255; H04L 47/6285
 USPC ......................................................... 709/223
 See application file for complete search history.

(56) References Cited

U.S. PATENT DOCUMENTS

| | | | | |
|---|---|---|---|---|
| 4,403,286 A | * | 9/1983 | Fry | G06F 9/505 710/15 |
| 5,357,612 A | | 10/1994 | Alaiwan | |
| 5,539,739 A | * | 7/1996 | Dike | G06F 15/17381 370/352 |
| 5,621,798 A | | 4/1997 | Aucsmith | |
| 5,664,114 A | * | 9/1997 | Krech, Jr. | G06F 5/06 709/234 |
| 5,675,579 A | * | 10/1997 | Watson | G01R 31/31727 370/241 |
| 6,374,297 B1 | * | 4/2002 | Wolf | G06F 9/505 707/999.01 |

(Continued)

FOREIGN PATENT DOCUMENTS

EP   1696611   8/2006

OTHER PUBLICATIONS

Office Action for U.S. Appl. No. 15/269,419, dated Jul. 13, 2018, Wojciak, "First-In First-Out Queues for Network-Accessible Queuing and Messaging Services", 20 pages.

(Continued)

*Primary Examiner* — Michael Won
(74) *Attorney, Agent, or Firm* — Lee & Hayes, P.C.

(57) ABSTRACT

Technologies are disclosed for providing a workload management service for first-in, first-out ("FIFO") queues in a network-accessible message queuing service within a service provider network. When a host is overloaded, or about to become overloaded, the affected host sends an alarm to the workload management service. The workload management service determines a set of other hosts that have lower workloads based upon performance metrics. The workload management service selects a new host from the set of hosts for moving a FIFO queue from the overloaded cluster. The workload management service seals the FIFO queue fragment at the overloaded host for writing of new messages and new messages having the same message group identifier are written to a new FIFO queue fragment on the new host. Messages are not read from the new FIFO queue fragment until all messages are read from the sealed FIFO queue fragment on the overloaded cluster.

20 Claims, 9 Drawing Sheets

(56) References Cited

U.S. PATENT DOCUMENTS

| | | | | |
|---|---|---|---|---|
| 6,701,393 | B1* | 3/2004 | Kemeny | G06F 12/122 710/40 |
| 7,593,331 | B2* | 9/2009 | Patel | H04L 1/1874 370/231 |
| 7,657,706 | B2* | 2/2010 | Iyer | G06F 12/0223 711/109 |
| 8,904,389 | B2* | 12/2014 | Bingham | G06F 9/45533 345/440 |
| 8,942,248 | B1* | 1/2015 | Cheung | H04L 7/0041 370/412 |
| 9,336,162 | B1* | 5/2016 | Sathe | G06F 12/0802 |
| 9,350,819 | B2 | 5/2016 | Bhagavatula | |
| 9,396,039 | B1* | 7/2016 | Arguelles | G06F 9/5083 |
| 2002/0059165 | A1* | 5/2002 | Hersh | G06F 9/52 |
| 2002/0152305 | A1* | 10/2002 | Jackson | H04L 41/5035 709/224 |
| 2002/0181484 | A1* | 12/2002 | Aimoto | H04L 47/10 370/413 |
| 2003/0220987 | A1* | 11/2003 | Pearson | G01C 23/00 709/220 |
| 2004/0151114 | A1* | 8/2004 | Ruutu | H04L 29/06 370/230 |
| 2004/0267691 | A1* | 12/2004 | Vasudeva | G06F 11/3409 |
| 2005/0125557 | A1 | 6/2005 | Vasudevan et al. | |
| 2006/0045005 | A1* | 3/2006 | Blackmore | H04L 1/0079 370/216 |
| 2006/0098675 | A1* | 5/2006 | Okuno | H04L 49/90 370/412 |
| 2007/0266126 | A1* | 11/2007 | Clark | G06F 12/0831 709/223 |
| 2009/0125604 | A1* | 5/2009 | Chang | H04L 69/16 709/212 |
| 2010/0274972 | A1* | 10/2010 | Babayan | G06F 9/3842 711/125 |
| 2010/0325268 | A1* | 12/2010 | Muthiah | G06F 9/505 709/224 |
| 2012/0005683 | A1* | 1/2012 | Bower | G06F 9/5094 718/103 |
| 2012/0110632 | A1* | 5/2012 | Burghart | G06F 21/604 726/1 |
| 2013/0024690 | A1 | 1/2013 | Bhagavatula et al. | |
| 2013/0263142 | A1* | 10/2013 | Miyamae | G06F 9/5033 718/102 |
| 2014/0095693 | A1* | 4/2014 | Apte | H04L 67/1008 709/224 |
| 2015/0263863 | A1 | 9/2015 | Kalkunte | |
| 2015/0264122 | A1* | 9/2015 | Shau | H04L 67/10 709/203 |
| 2016/0055429 | A1 | 2/2016 | Schwartz | |
| 2016/0092259 | A1* | 3/2016 | Mehta | G06F 9/45558 718/1 |
| 2016/0092272 | A1* | 3/2016 | Karaje | G06F 9/5011 718/104 |
| 2016/0182397 | A1* | 6/2016 | McFarlin | H04L 41/5051 709/226 |
| 2018/0054394 | A1 | 2/2018 | De Schepper et al. | |
| 2018/0063842 | A1 | 3/2018 | Hu | |
| 2018/0136905 | A1 | 5/2018 | Behrend et al. | |
| 2018/0176855 | A1 | 6/2018 | Liu | |
| 2018/0184458 | A1 | 6/2018 | Wilhelmsson | |
| 2018/0190106 | A1 | 7/2018 | Hamain et al. | |

OTHER PUBLICATIONS

Final Office Action dated Feb. 8, 2019 for U.S. Appl. No. 15/269,419 "First-In First-Out Queues for Network-Accessible Queuing and Messaging Services" Wojciak, 27 pages.

* cited by examiner

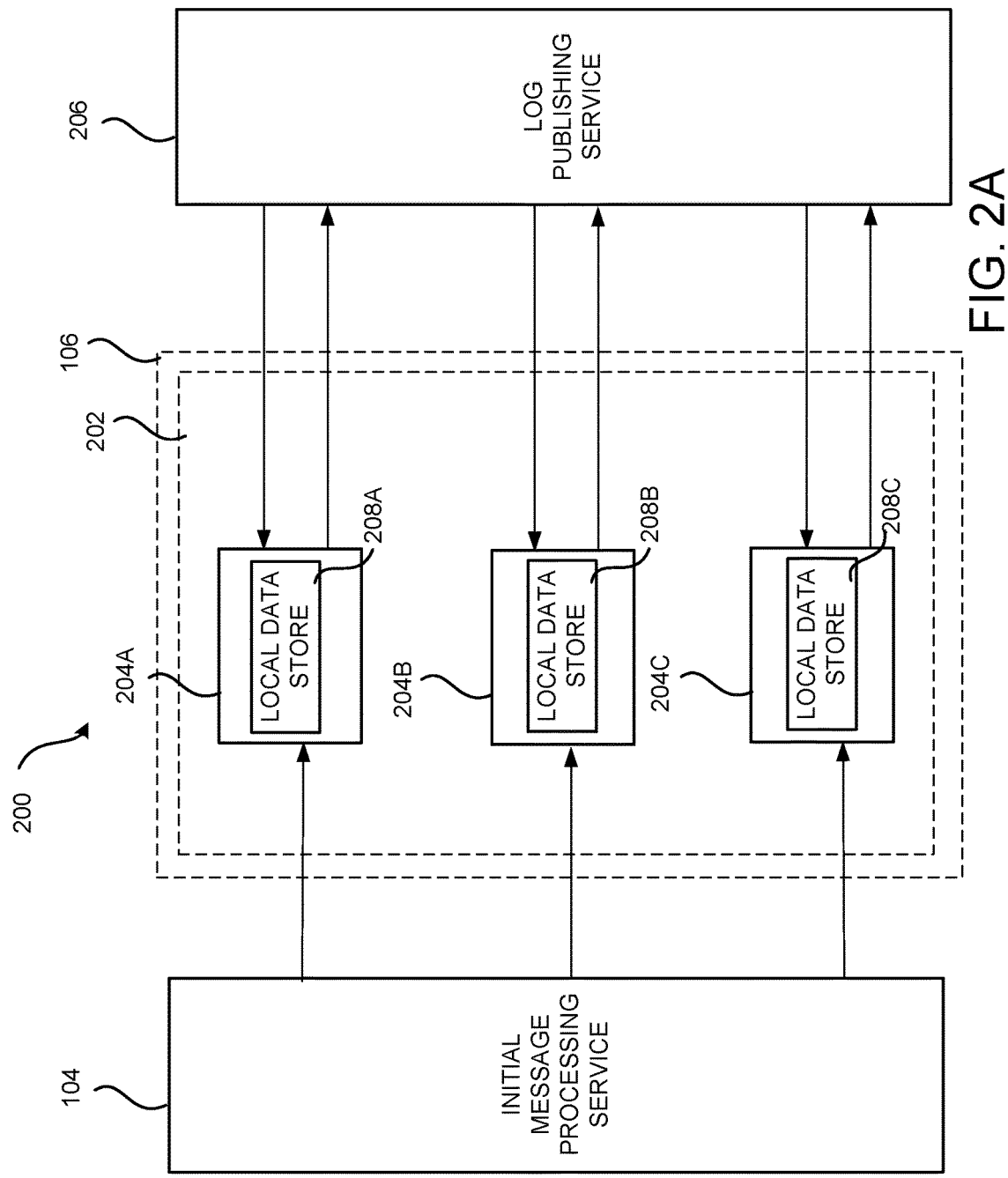

WORKLOAD MANAGEMENT SERVICE FOR FIRST-IN FIRST-OUT QUEUES FOR NETWORK-ACCESSIBLE QUEUING AND MESSAGING SERVICES

CROSS REFERENCE TO RELATED APPLICATIONS

This disclosure is related to U.S. patent application Ser. No. 15/269,419, filed Sep. 19, 2016, which is incorporated herein by reference in its entirety.

BACKGROUND

Currently, certain network-accessible queuing services generally guarantee high availability, scalability and at-least-once delivery, but do not guarantee ordering consistency with respect to messages. Messages can be delivered without preserving order. Additionally, messages can be delivered with duplicates. This allows such network-accessible queuing services to have very high scalability, but requires user software to be aware of potential duplicate messages and employ complicated strategies to cope with the possibility (e.g., ignore duplicates, reorder messages or design the protocol between message producer and message processor to be idempotent).

On the other hand, certain on-premise messaging services claim to preserve order of messages and exactly-once delivery. However, this functionality can be invalidated when such on-premise messaging services are configured in multi-node scalable clusters, in high-availability setups during failover or when the message producer/processor fails unexpectedly. It is generally easier for developers to write program code that does not have to deal with messages delivered out of order and/or duplicated. Furthermore, the message queues for the multi-node scalable clusters can become overloaded if not properly managed, thereby increasing latency of the message processing.

The disclosure made herein is presented with respect to these and other considerations.

BRIEF DESCRIPTION OF THE DRAWINGS

FIGS. 2A and 2B schematically illustrate a configuration where the queuing service of FIG. 1 includes a cluster of hosts for managing of FIFO queues, according to one configuration;

DETAILED DESCRIPTION

Figure 1:
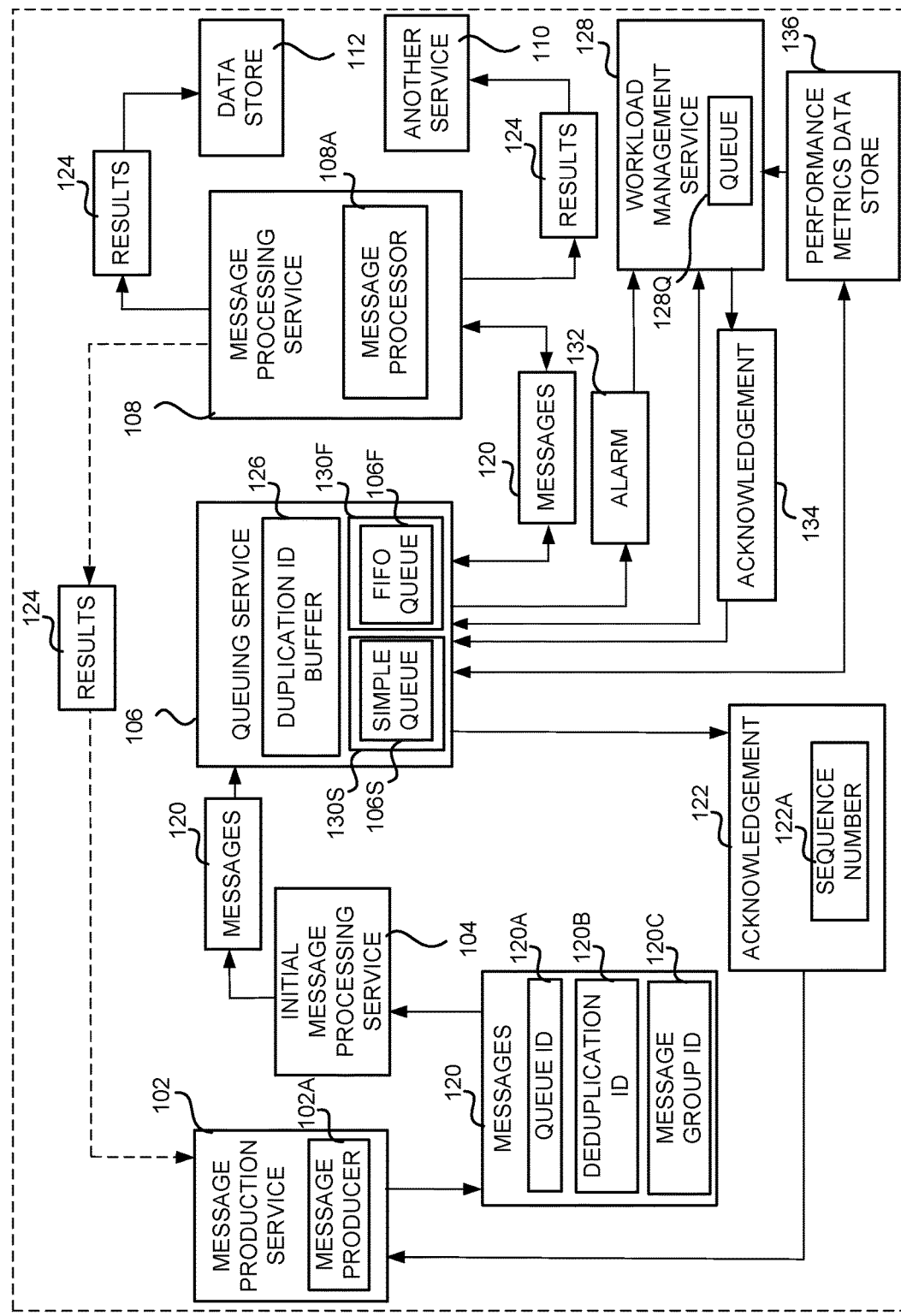
FIG. 1 schematically illustrates a service provider network for message processing utilizing FIFO queues within a network-accessible queuing service, according to one configuration.

The following detailed description is directed to technologies for providing first-in, first-out ("FIFO") capabilities for a network-accessible message queuing service within a service provider network. Utilizing the technologies described herein can improve consistencies in the processing of messages by a network-accessible message processing service. Ordering of the messages received at the queuing service can be preserved and thus, the messages are processed in order by the message processing service. A workload management service manages the workload of hosts providing the queuing service thereby helping prevent overloading of the hosts. This can help maintain throughput of messages within the queuing service while maintaining ordering of the messages received at the queuing service processing the messages in order by the message processing service. Technical benefits other than those specifically identified herein might be realized through an implementation of the disclosed technologies.

In accordance with various configurations, a network-accessible queuing service can preserve an order of messages received at the queuing service. Generally, messages are produced, where the messages can trigger an event such as providing information, providing data, requesting some type of operation, generating a new message, updating something, etc. These messages can be provided to the queuing service. A message processing service monitors the queuing service and processes messages from the queuing service in a FIFO manner. The processed messages can be returned to the message producer and/or can be provided to other entities. Generally, the processed messages are also provided to a data store.

The message processing service can accept or retrieve messages from the queuing service, parse the messages, potentially transcode/filter the messages, and persist the messages, as well as other functions. The message processing service can contain processing logic that is triggered by the messages. Based upon the processing logic, the messages can be processed (or consumed) and acknowledged. As previously noted, the processed messages can be modified and passed to the message producer, a downstream "listener" such as another network service, and/or stored in a data store.

In accordance with various configurations, in order to achieve a highly available and highly consistent message queuing service, and thereby a highly available and highly consistent message processing service, a FIFO technique is utilized by the message queuing service. Messages can be produced by a message production service. The messages might be provided to an initial message processing service. The initial processing service can determine an identification of a network-accessible queuing service by examining an identification within the message. The messages can be created in response to program code of a user being presented to the service provider network for execution by the service provider network. The user, prior to submitting the program code to the service provider network, creates a queue within the queuing service. The user can specify whether the queue is a FIFO queue or is a simple queue. Simple queues include queues that can include at-least-once delivery semantics and possible duplicate messages, as well as out-of-order delivery of messages. FIFO queues, as compared to simple queues, might include exactly-once delivery semantics and ordering guarantees.

Based upon the identification of the queue, the initial message processing service can forward the message, or a batch of messages, to the queue within the queuing service. The queuing service can send an acknowledgment of receipt of the message back to the message production service, thereby informing the user that the message or batch of messages has been received. In configurations, for a FIFO queue, the acknowledgement might include a sequence number that provides the position of the message within the FIFO queue.

The queuing service can determine a message deduplication identifier for the message, where the message deduplication identifier can be used to prevent processing of duplicate messages. The queuing service can also determine if the message deduplication identifier has already been received with another message. If so, then the queuing service can ignore the message and send the acknowledgement of receipt for the originally received message to the message production service. However, if the message with the message deduplication identifier has not yet been received, then the message might be stored or maintained within the queue provided by the queuing service. Generally, the deduplication identifier may be assigned by a user via the message production service.

The queuing service can also determine a message group identifier for the message. Based at least upon the message group identifier, the message processing service can process the message. While the message is being processed, the message can be made inaccessible within the queuing service to other message processing services.

Once the message has been processed, the message can be deleted from the queue within the queuing service and results of the processing can be provided back to the message production service, to another downstream listener such as another service, and/or to a data store. In configurations, if the message processing service fails to properly process the message, then the message is once again made accessible within the queuing service to other message processing services. Additionally, a time window can be utilized where, if the message is not properly processed during the time window, then the message is deemed to have failed during processing and can be made accessible again to other processing services.

In configurations, one or more hosts provide the FIFO queues at the queuing service. As messages are provided to a FIFO queue and retrieved from the FIFO queue by the message processing service, the hosts might need to be scaled up and/or down depending upon the workload of the servers. For example, if a particular FIFO queue is receiving an increasingly large number of messages and/or the queue is sending messages to the message processing service at a high rate, the host providing the FIFO queue might become overloaded if multiple FIFO queues provided by the host are experiencing similar situations.

In configurations, for such a scenario, a workload management service is provided to monitor the workload of hosts providing the FIFO queues at the queuing service. In order to help ensure that the FIFO queues provide an orderly processing of the messages, the FIFO queues can be divided into two or more fragments in order to allow for transition of messages directed to a FIFO queue fragment at one host to another FIFO queue fragment at another host. A first fragment or head of the FIFO queue can be sealed at a first host for writes, for example, meaning that no more messages may be written to the first fragment.

A second fragment or tail of a FIFO queue can then be created at a second host. Newly arriving messages having the same group identifier as the messages in the head of the first FIFO queue fragment can then be written to the second FIFO queue fragment. In this way, the workload management service might ensure that the messages in the second FIFO queue fragment (i.e. the tail fragment of the FIFO queue) are not read (i.e., sent for processing to the message processing service) until all of the messages in the first FIFO queue fragment (i.e., the head fragment of the FIFO queue) have been read and successfully processed by the message processing service.

In configurations, in order to determine problems at hosts and/or their associated FIFO queues, performance metrics might be evaluated. Performance metrics include, for example, a message enqueue rate, enqueue throughput, a message dequeue rate and a queue size. Such metrics can be periodically reported by the queueing service to a performance metrics data store. The workload management service can query the metrics data store for the performance metrics. Based upon a threshold, hosts can be evaluated and determined as to whether or not FIFO queues need to be moved from the hosts by sealing a fragment for writes at a host and establishing a new fragment for writes at a new host. Additionally, the performance metrics can be utilized to determine which hosts are available for providing new FIFO queues. In configurations, a set of hosts is selected as being suitable for providing new FIFO queues. The workload management service can randomly select a host or cluster of host from the selected set of hosts for establishing a new FIFO queue. This helps ensure that the same host is not continually selected for providing new FIFO queues, and thereby becoming overloaded itself.

In configurations, the hosts monitor themselves and, when a host begins to become overloaded, the overloaded host sends an alarm to the workload management service. In configurations, the workload management service acknowledges the alarm. The workload management service can then begin to work on evaluating the performance metrics of the FIFO queues of the host in order to determine which FIFO queues need to be moved to a different host by sealing a fragment for writes at the overloaded host and establishing a new fragment for writes at the different host. Based upon evaluating performance metrics of other hosts, other hosts can be selected as being suitable for moving a FIFO queue from the overloaded host to one of the other hosts.

In configurations, the queuing service is organized into fleets of hosts for providing FIFO queues. In configurations, resources for the queuing service comprise a fleet of servers, wherein the servers comprise one or more processors or central processing units ("CPUs").

Also, in configurations, resources for the message processing service include a fleet of servers, wherein the servers comprise one or more processors or CPUs. In configurations, the message processing service servers host virtual machine instances. In other configurations, the resources for the message processing service include stateless event-driven compute services. In configurations, the resources for the message processing service include a mixture of servers and stateless event-driven compute services or other types of computing resources. For example, the resources can primarily include stateless event-driven compute services and servers that can be utilized as a back-up for overflow for the stateless event-driven compute service. Additional details regarding the various components and processes described above for FIFO queues within a message processing service infrastructure will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The configurations described herein can also be practiced in distributed computing environments, where tasks can be performed by remote computing devices that are linked through a communications network. In a distributed computing environment, program modules can be located in and executed from both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 schematically illustrates a service provider network 100 for message processing, wherein one or more of the components are provided within the service provider network 100. Generally, a message production service 102 produces streams of messages 120. Such messages 120 provide information, data, requests for an event or service, instruct to generate a new message 120 to provide to another service or entity, update something, etc. The messages 120 can be produced using program code provided by a user of the service provider network 100. In configurations, the message production service 102 includes multiple message production services 102.

The produced messages 120 might be provided to an initial message processing service 104 that can determine an identification of a queue within a network-accessible queuing service 106 based upon a queue identifier 120A within the messages 120. As will be discussed in more detail later, if the identified queue is a simple queue, i.e. not a FIFO queue, then the initial message processing service 104 can remove or eliminate a deduplication identifier 120B and/or a message group identifier 120C. Simple queues can include at-least-once delivery semantics and possible duplicate messages, as well as out-of-order delivery of messages. FIFO queues 16F, in contrast, can include exactly-once delivery semantics and ordering guarantees. The message deduplication identifier 120B can be used to prevent processing of duplicate messages 120 while the message group identifier 120C identifies a message group to which a message 120 belongs.

The messages 120 can then be provided to the queuing service 106 to await processing or consumption by a message processing service 108. In configurations, the message queuing service 106 and the message processing service 108 are a network-accessible queuing service and a network-accessible message processing service, i.e., the queuing service and the message processing service are located within the service provider network 100. For example, the message processing service 108 can be provided by on-demand computing services and/or serverless compute services provided by infrastructure service providers. In configurations, the queuing service 106 includes the initial message processing service 104, i.e. performs the functions of the initial messaging service 104. In configurations, the queuing service 106 ignores a deduplication identifier 120B and/or a message group identifier 120C of messages 120 if an identified queue is a simple queue as opposed to removing or eliminating the deduplication identifier 120B and/or the message group identifier 120C.

The message processing service 108 includes multiple message processors 108A and can monitor or "listens to" the queuing service 106 for messages 120 that need to be processed. As messages 120 arrive at the queuing service 106, the message processing service 108 can retrieve or dequeue the messages 120 from the queuing service 106 and process the messages 120 using one or more message processors 108A. The results 124 of the processing of the messages 120 can be provided back to the message production service 102, to another service 110 or downstream listener, and/or to a data store 112 for access by various services and entities.

Prior to utilizing the message production service 102, the user of the service provider network 100 can create a queue within the queuing service 106. At the time of creation of the queue, the user can specify whether the queue will be a simple queue 106S or a FIFO queue 106F. As previously noted, simple queues 106S can be highly scalable queues that can include at-least-once delivery semantics and possible duplicate messages 120, as well as out-of-order delivery of messages 120. FIFO queues 106F can be highly consistent with exactly-once delivery semantics and ordering guarantees.

FIFO queues 106F for message processing services can provide various types of behavior. For example, when a single message producer 102A produces messages 120 and a single message processor 108A processes the messages 120, the message producer 102A can publish messages 120 sequentially (e.g., a single logical thread) and forward the messages 120, for example, via a "SendMessage(Batch)" application programming interface ("API") call to the initial message processing service 104, which can forward the messages 120 to the queuing service 106. The message producer 102A can wait for a successful response (acknowledgement) 122 for the SendMessage(Batch) API call before proceeding to production, or at least forwarding, the next message 120 or batch of messages 120 via another SendMessage(Batch). In configurations, the acknowledgement 122 response includes, for example, "SequenceNumber" attribute 122A, which provides a position of each message 120 of the batch within a FIFO queue 106F within the queuing service 106.

In configurations, batches of messages 120 are in a range of one to ten, although larger batches of messages 120 can be used if desired. When the message processor 108A processes the messages 120, the messages 120 become inaccessible within the FIFO queue 106F until the messages 120 are successfully processed and deleted, or a time window for processing expires. The expiration of the time window can indicate that processing of the messages 120 has failed and the messages 120 become accessible again within the queue 106F.

In configurations, there can be a single message producer 102A and multiple message processors 108A for processing of the messages 120 to provide high availability of message processing. In such a configuration, operations are the same as with the single message producer 102A and the single message processor 108A arrangement previously described, but there are multiple message processors 108A polling the queuing service 106 for batches of messages 120.

Any of the multiple message processors 108A can receive a next batch of messages 120 for processing from the queuing service 106. When a message processor 108A processes a batch of messages 120, the messages 120 become inaccessible within the FIFO queue 106F until the messages 120 are successfully processed and deleted, or a time window for processing expires. The expiration of the time window can indicate that processing of the messages 120 has failed and the messages 120 can become accessible again within the queue 106F. No out-of-order deliveries are possible, as all message processors 108A have to wait for the previous batch of messages 120 to be deleted (i.e. the previous batch of messages 120 has been successfully processed) or for the current message processor 108A processing the messages 120 to fail and the batches of messages 120 to become accessible again. Thus, only one of the message processors 108A is doing actual message processing at any given time. The messages 120 are thereby processed in an ordered manner.

In order to achieve higher message processing throughput using the multiple message processors 108A, and still maintain a high availability of message processing resources, the queueing service 106 can support a concept of message groups for its FIFO queues 106F. The message producers 102A of the message production service 102 can tag each message with a message group identifier (e.g., "MessageGroupId") 120C. The queueing service 106 can ensure that messages 120 belonging to the same MessageGroupId 120C will be processed in a strictly ordered manner. Thus, when a batch of messages 120 are being processed, messages 120 having the same MessageGroupIds 120C as the batch of messages 120 being processed are also inaccessible within the FIFO queue 106F for processing. Messages 120 having different MessageGroupIds 120C can be processed out of order with respect to the order in which they were received with respect to the different MessageGroupIds 120C.

In configurations, when a message processor 108A requests another message or batch of messages 120 for processing, the message processor 108A cannot specify any particular MessageGroupId 120C. The queuing service 106 can return messages 120 belonging to message groups that are not currently being processed by another message processor 108A. When a message processor 108A processes the messages 120, the messages 120 can become inaccessible within the FIFO queue 106F until the messages 120 are successfully processed and deleted, or a time window for processing expires. The expiration of the time window can indicate that processing of the messages 120 has failed and the messages 120 become accessible again within the queue 106F. In configurations, there is no consumer affinity for message groups in that once a message processor 108A is finished with a batch of messages 120 having a particular MessageGroupId 120C by deleting the messages 120 from the queuing service 106, further messages 120 belonging to the group can be delivered to another message processor 108A.

For example, assume a message stream of batches of messages 120 is related to updates to user data. Changes applied to a particular user should be processed in sequence, but changes applied to different users can be applied in parallel. The message producer 102A can tag each message with a MessageGroupId 120C that represents a particular user identifier. The message processors 108A can request messages 120 for processing, and the FIFO queues 106F of the queuing service 106 can ensure that messages 120 related to each user identifier (based upon the MessageGroupId 120C) are not processed in parallel by multiple message processors 108A. The messages 120 are delivered in sequence to the message processors 108A. The message processing service 108 can be effectively scaled up to the number of different userIds present in the FIFO queues of the queuing service 106 in order to process messages 120 in parallel.

In configurations, multiple message producers 102A can send messages 120 to a single FIFO queue 106F. The multiple message producers might not be concerned with the global order of messages 120 in the queue 106F and the FIFO queue 106F will generally ensure that messages 120 from a particular message producer 102A will have their order preserved. One option to ensure preservation of the global order of messages 120 in the FIFO queue 106F can be to partition the message producers 108A of the message processing service 108 to own a particular set of MessageGroupIds 120C.

A user might not be permitted to provide explicit message order for the FIFO queues 106F. Message order may be determined by the sequence of, e.g., SendMessage(Batch), API calls. The FIFO queue 106F provides that if message(s) A is sent, a successful response (acknowledgement) 122 is waited for and then message(s) B is sent, that A will be enqueued in the FIFO queue 106F before B.

Sending messages 120 in parallel might not ensure proper ordering of messages 120 between API calls. Sending messages 120 without waiting for a successful response also might not ensure proper ordering between API calls. The FIFO queues 106F can return the resulting final position of a message in a particular FIFO queue as part of the response.

In configurations, when sending multiple messages 120 in a single batch, the order of messages 120 within the batch is preserved as the enqueue order into the FIFO queue 106F. If parallel batch sends are made, the messages 120 of one batch of messages 120 can be intertwined with messages 120 from another batch, but within a single batch, the order of messages 120 is still preserved.

In configurations, the queuing service 106 provides an assurance of exactly-once message processing via its FIFO queues 106F of the queuing service 106. SendMessage (batch) API calls can be retried and idempotent, e.g., remains unchanged for a period of time. The period of time may be, for example, five minutes. In case of an error, the user can keep retrying the SendMessage(batch) API call until an API call succeeds.

Additionally, each message sent to a FIFO queue 106F can include a unique deduplication identifier 120B (also referred to as an idempotency token), which may be provided by the user, that is included in the message. The queuing service 106 can perform deduplication based on the provided deduplication identifier 120B in the message. This can be done by comparing the deduplication identifier 120B to deduplication identifiers 120B stored in a deduplication identifier buffer 126 associated with the FIFO queue 106F and associated with messages 120 already received at the FIFO queue 106F. When messages 120 are received for a first time, deduplication identifiers 120B included within the messages 120 are stored in the deduplication identifier buffer 126. The scope of deduplication can be time-based and, in a configuration, is of a certain amount of time. In a configuration, the certain amount of time is five minutes.

Also, each request for messages 120 by a message processor 108A (e.g., a "ReceiveRequest" API call) may contain, for example, a unique deduplication identifier 120B, which might be provided by the user, for the ReceiveRequest API call. The queuing service 106 can perform deduplication based on the provided identifier based on the provided deduplication identifier 120B in the message. This can be achieved by comparing the deduplication identifier 120B to deduplication identifiers 120B stored in a deduplication identifier buffer 126 associated with the FIFO queue 106F and associated with messages 120 already sent from the FIFO queue 106F. This means that ReceiveRequest API calls can be repeatedly retried (until success) during a deduplication time window and that a "ReceiveCount" property on messages 120 can be increased only for actual receive attempts. The scope of deduplication is generally time-based. In a configuration, the deduplication time window may be, for example, five minutes.

In configurations, use of the ReceiveRequest deduplication identifier 120B is optional for the user. By default, the FIFO queue 106F will not return more messages 120 from the FIFO queue 106F if any message in the FIFO queue 106F is currently inaccessible. This means that a failed and retried ReceiveRequest API call without the ReceiveRequest deduplication identifier 120B will wait for the messages 120 to become accessible again, essentially pausing processing of messages 120 in the FIFO queue 106F. In configurations, if a message producer 108A fails to obtain a particular batch of messages 120 due to, for example, network issues, then the messages producer 108A can retry to obtain the batch of messages from the FIFO queue 106F. This can avoid unnecessary pausing of messages due to the unobtained batch of messages causing the FIFO queue 106F to not return additional messages 120 from the FIFO queue 106F. The attempts to retry obtaining the batch of messages 120 can be subject to a predetermined time limit upon expiration of which the processing fails and the batch of messages is made accessible to other message processors 108A.

As previously noted, when receiving multiple messages 120 in a single batch, the order of messages 120 within the batch can be preserved. If parallel batches are received, the messages 120 of one batch will typically not be intertwined with messages 120 from another batch since each batch represents a contiguous segment of messages 120. A message processor 108A can receive up to, for example, ten messages 120 in a single API call, e.g., a ReceiveMessage API call, in response to a ReceiveRequest API call, but the FIFO queue can return a smaller number of messages 120, even if more messages 120 are available. The message processor 108A may not rely on receiving batches of a certain size.

If a batch sent from the message producing service 102 contains multiple messages 120, some deliveries of messages 120 within the batch might fail. In configurations, if a delivery of a single message in the batch fails, no other message following that message in the batch will succeed. This allows retries of SendMessage(Batch) that skips over already delivered messages 120 and preserves the order of the messages 120. If a message contains a previously sent deduplication identifier 120B, that message will be deduplicated and will not change the previously received message's existing position in the FIFO queue 106F. Thus, if a message 120 is received and the message's deduplication identifier 120B is found within the deduplication identifier buffer 126, the received message is ignored or "dropped" by the queuing service 106. Also, the queuing service 106 sends the acknowledgement 122 that includes the SequenceNumber attribute 122A for the originally received message 120 to the message production service 102. Specifically, this allows the scenario of a message batching user that retries the failed API call, but includes new messages 120 in the retry batch.

Thus, the user will might only see duplicates of messages 120 when failing to properly retry API calls (until an API call succeeds) for an extended period of time (user program code bug, network partition, etc.). Compared to duplicates of messages 120 in simple queues 106S, the number of duplicates of messages 120 in FIFO queues 106F will be limited in nature. For example, for a particular FIFO queue 106F with no message groups or for a particular message group, one can see a duplication of up to message batch size, e.g., the last ten messages 120.

One reason for this limitation on the number of duplicate messages 120 is that the message producers 102A are not supposed to send new messages 120 for a particular message group until the previous batch is successfully sent, i.e. receipt of the previous batch is acknowledged with an acknowledgement 122. In an example, assume the maximum send batch message size is ten messages 120. If there is a long-lasting communication problem between the message producer 102A and the FIFO queue 106F of the queuing service 106, the end effect might be repetition of the same ten failing messages 120 in the FIFO queue 106F due to the deduplication time window expiring repeatedly and the message producer 102A repeatedly retrying sending of the same ten messages 120. Additionally, the FIFO queue 106F might not provide more messages 120 from a message group (based upon a MessageGroupId 120C) until the previously received messages 120 are deleted from the queue 106F (successfully processed) or become accessible again in the queue 106F (due to failure of processing).

Thus, assume that the maximum message batch size is ten messages 120. If there is a long-lasting communication problem between the message processor 102A and the FIFO queue 106F, the end effect can be repetition of the same ten failing messages 120 in the FIFO queue 106F due to the deduplication time window expiring repeatedly or the messages 120 becoming accessible again due to failing deletes.

In order to provide flexibility to users, if the user creates a simple queue 106S, then messages 120 produced by the message production service 102 will have the deduplication identifier 120B and/or message group identifier 120C removed or ignored by the initial message processing service 104. This allows the user to use most any software development kit ("SDK") regardless of the type of queue the user creates.

In configurations, users using a SDK that cannot accept or provide a deduplication identifier 120B can still get message deduplication through enabling an automatic content-based deduplication creation attribute for messages 120. The initial message processing service 104 or the queuing service 106 can compare the content of the message body and attributes to determine message repetition. A content-based deduplication identifier can be generated for each message if desired.

In configurations, a workload management service 128 is provided for managing the workload of the queueing service 106. The workload management service 128 works to keep hosts 130F, 130S providing the queues at the queueing service 106 from becoming overloaded. Additionally, the workload management service 128 can select hosts 130F, 130S for establishing new queues, e.g., FIFO queues 106F and simple queues 106S. The queuing service 106 can include multiple hosts 106F and 106S that provide FIFO queues 106F and simple queues 106S, respectively.

In configurations, and as will be described in more detail herein, the hosts 130F at the queueing service 106 can monitor their own performance metrics periodically. For example, performance metrics may include an enqueue rate of a FIFO queue 106F, i.e., the number of enqueue requests on the host per second, enqueue throughput, i.e., number of messages per second or size of messages per second, a dequeue rate, i.e., the number of dequeue requests on the host per second, and a FIFO queue size. If one or more of the performance metrics exceeds a threshold, then an alarm or warning 132 can be provided to the workload management service indicating the potential overloading of a host 130F. The alarm 132 can be provided via an application programming interface (API) from the host 130F to the workload management service 128. In embodiments, the workload management service 128 monitors the hosts 130F and detects when a host is overloaded or about to become overloaded based upon performance metrics. In configurations, the performance metrics for the hosts 130F are stored in a performance metrics data store 136 that the workload management service 128 may query for host performance metrics. In configurations, the hosts 130S also monitor their own performance metrics periodically and may store the performance metrics in the performance metrics data store 136.

In configurations, the alarm 132 includes the performance metric or metrics causing the alarm 132 and the primary FIFO queues 106F that may be the cause of the alarm 132. In configurations, the workload management service 128 places the alarm 132 in a workload queue 128Q and acknowledges the alarm 132 with an acknowledgment 134 to the host 130F that sent the alarm 132. The alarm 132 can then be read from the workload queue 128Q and processed by the workload management service 128. Since processing of the alarm 132 can be time consuming, sending the acknowledgement 134 might allow the host 130F to continue handling messages without waiting for the workload management service 128 to process the alarm 132.

As will be discussed in more detail herein, FIFO queues 106F are divided into one or more FIFO queue fragments. Processing of the alarm 132 can include determining which fragments of FIFO queues 106F should have messages 120 having the same message group ID 120C written to another fragment of FIFO queue 106F at another host 130F to address the issue, i.e. relieving the overloaded host 130F, finding a new available host 130F with lower message traffic, i.e. lower performance metrics, creating a new fragment of a FIFO queue 106F and providing it on the new host 130F. Thus, the workload management service 128 can query the performance metrics data store 136 for performance metrics of hosts 130, evaluate the performance metrics, and select a set of potential hosts 130F for the new fragment of a FIFO queue 106F. In configurations, the performance metrics are aggregated into a single workload score.

In configurations, the workload management service 128 randomly selects a host 130F from the selected set of potential hosts 130F for the new fragment of a FIFO queue 106F. In other configurations, the host 130F is selected based upon how recently a fragment of a FIFO queue 106F has been newly placed thereon. Once the new fragment of FIFO queue 106F is available on the new host 130, enqueue requests for the stream of messages 120 including the same message group ID 120C will now be received at the new fragment of FIFO queue 106F. A similar process can be used by the workload management service 128 to select a potential host and establish new FIFO queues 106F comprising fragments on hosts 130F for users.

Figure 2B:
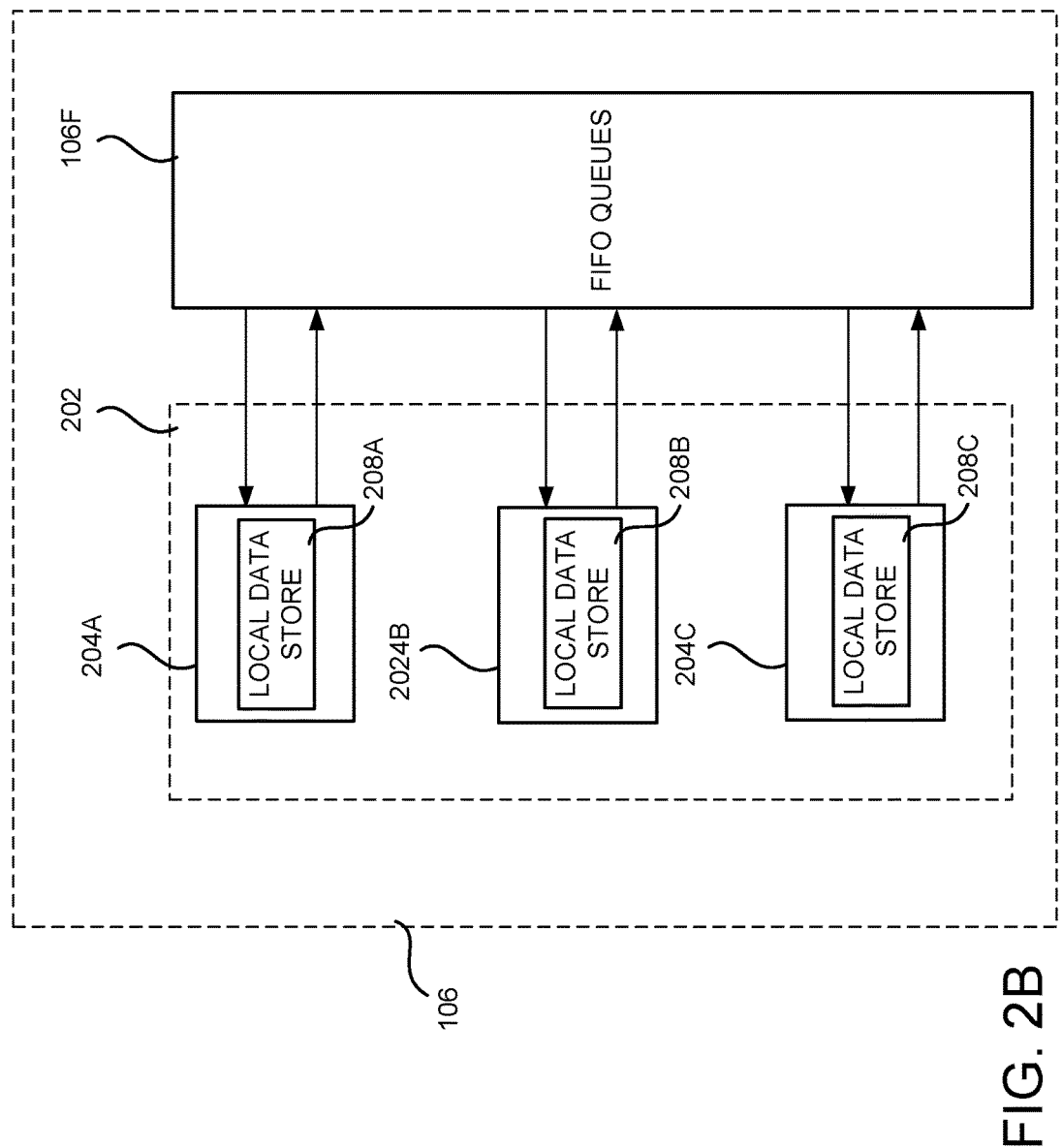

FIGS. 2A and 2B schematically illustrate a configuration 200 where the queuing service 106 of FIG. 1 includes a cluster 202 of hosts 204 for providing and managing queues 106S, 106F. FIGS. 2A and 2B illustrate three hosts 204 in the cluster 202, but more or fewer hosts 204 can be included as desired. Clusters 202 can include and manage either simple queues 106S or FIFO queues 106F. Clusters 202 might not, however, include or manage both simple queues 106S or FIFO queues 106F. However, in configurations, clusters 202 can include both simple queues 106S or FIFO queues 106F. In the example configuration of FIGS. 2A and 2B, the cluster 202 includes and manages FIFO queues 106F.

The three hosts 204 can share state through a log publishing service 206 for high availability. All hosts 204 in the cluster 202 can manage the same FIFO queues 106F, with the same messages 120 being contained in the FIFO queues 106F and the same state of the FIFO queues 106F (collection of inaccessible messages 120, deduplication buffers, etc.). Thus, the three hosts 204 become a replicated state machine providing high availability and throughput for the FIFO queues 106F.

Each host 204 might have its own private local data store 208 to keep track of the queues and messages 120 (the data stores 208 themselves are not replicated between hosts 204). Additionally, in configurations, each host 204 is active and accepts API calls (a multi-master arrangement). In configurations, the hosts 204 do not talk to each other directly. For any read-only API operation, the hosts 204 can consult their local data store 208 and return an answer. For any mutable API operation, the hosts 204 can check the state of the queues 106F in their local data store 208 and, based on the state, can propose a transition of state related to the state of the queues 106 to the log publishing service 206.

The hosts 204 can learn about committed transitions of state and transactions from the log publishing service 206 and apply modifications to their local data stores 208. The committed transitions of state have an associated unique, ever increasing (but not necessarily sequential) sequence number. In scenarios, where an API call depends on a result from a previous API call, this sequence number can be passed as part of the result from the preceding API call and as an argument to the following API call. A specific example of this is a ReceiveMessages API call followed by e.g., a DeleteMessage API call for deleting messages in a FIFO queue 106F or e.g., a ChangeMessageAccessibility API call for changing accessibility of messages in a FIFO queue 106F.

In configurations, a FIFO queue 106F can include two or more fragments including a head fragment and a tail fragment, although a FIFO queue 106F may comprise only a single fragment, i.e. the head fragment and tail fragment may be the same fragment. SendMessage(Batch) API calls affect the tail of the FIFO queue 106F by appending new messages 120 to the tail or end fragment of the FIFO queue 106F, while ReceiveMessage/DeleteMessage/ChangeMessageAccessibility API calls all affect the head or front fragment of the FIFO queue 106F by removing messages 120 from the head of the FIFO queue 106F.

Accordingly, in configurations, a queue fragment for FIFO queues 106F can be defined, where a queue fragment represents a portion of a FIFO queue 106F. Queue fragments are hosted on a specific single cluster 202. Each queue fragment can have a sequential number associated with it. Queues 106F can start with fragment 1 at the time of creation. The FIFO queues 106F can include multiple queue fragments, e.g., two or more queue fragments. However, in configurations, as previously noted, a FIFO queue 106F might include only a single fragment. FIFO queue fragments can be ordered, e.g., fragment 1, fragment 2, fragment 3, etc. The ordered FIFO queue fragments can be distributed over multiple clusters 202. Messages 120 can be read from ordered FIFO queue fragments in order to preserve the FIFO order of processing of messages 120. Thus, messages 120 are not read from FIFO queue fragments numbered 2 or higher until all messages 120 are read from FIFO queue fragment 1 and so on.

In configurations, each queue fragment includes one of the following states: Readable for messages/writeable for messages; Readable for message/Sealed for writes of messages; and Sealed for reads of messages/Sealed for writes of messages. A single FIFO queue fragment may go through the following states, which affects the API calls in the following manner as illustrated in Table 1.

TABLE 1

| Readable | Send Message | → succeeds |
|---|---|---|
| Writeable | ReceiveMessage | → succeeds |
| ↓ | DeduplicateMessage | → ERROR_NOT_SEALED_FOR_WRITES |
|  | DeduplicateReceive | → ERROR_NOT_SEALED_FOR_READS |
|  | SealForWriter(nextCluster is X) | |
| Readable | SendMessage | → ERROR_SEALED_FOR_WRITES(nextCuster is X) |
| SealedForWrites | | |
| ↓ | ReceiveMessage | → succeeds |
|  | DeduplicateMessage | → succeeds |
|  | DeduplicateReceive | → ERROR_NOT_SEALED_FOR_READS |
|  | SealForReads0 | |
| SealedForReads | SendMessage | → ERROR_SEALED_FOR_WRITES(nextCuster is X) |
| SealedForWrites | | |
|  | ReceiveMessage | → ERROR_SEALED_FOR_READS |
|  | DeduplicateMessage | → succeeds |
|  | DeduplicateReceive | → succeeds |

Thus, in configurations, a FIFO queue 106F includes a sequence of at least one non-overlapping queue fragment and a set of four forward moving pointers to queue fragments to keep track of the history and current state of the particular queue 106F. Often, the queue 106F has only a single fragment, but Table 2 shows an example of a FIFO queue 106F with multiple fragments 5 through 10 on clusters C2 through C5.

TABLE 2

| Pointers | Fragment | Cluster | Writes | Reads |
|---|---|---|---|---|
| ReadDe-duplication | 5 | C3 | Sealed(next = C2) | Sealed |
| Read | 6 | C2 | Sealed(pext = C3) | Readable |
|  | 7 | C3 | Sealed(pext = C5) | Sealed |
| WriteDe-duplication | 8 | C5 | Sealed(next = C4) | Readable |

TABLE 2-continued

| Pointers | Fragment | Cluster | Writes | Reads |
|---|---|---|---|---|
|  | 9 | C4 | Sealed(next = C5) | Readable |
| Write | 10 | C5 | Writeable | Readable |

Figure 3:
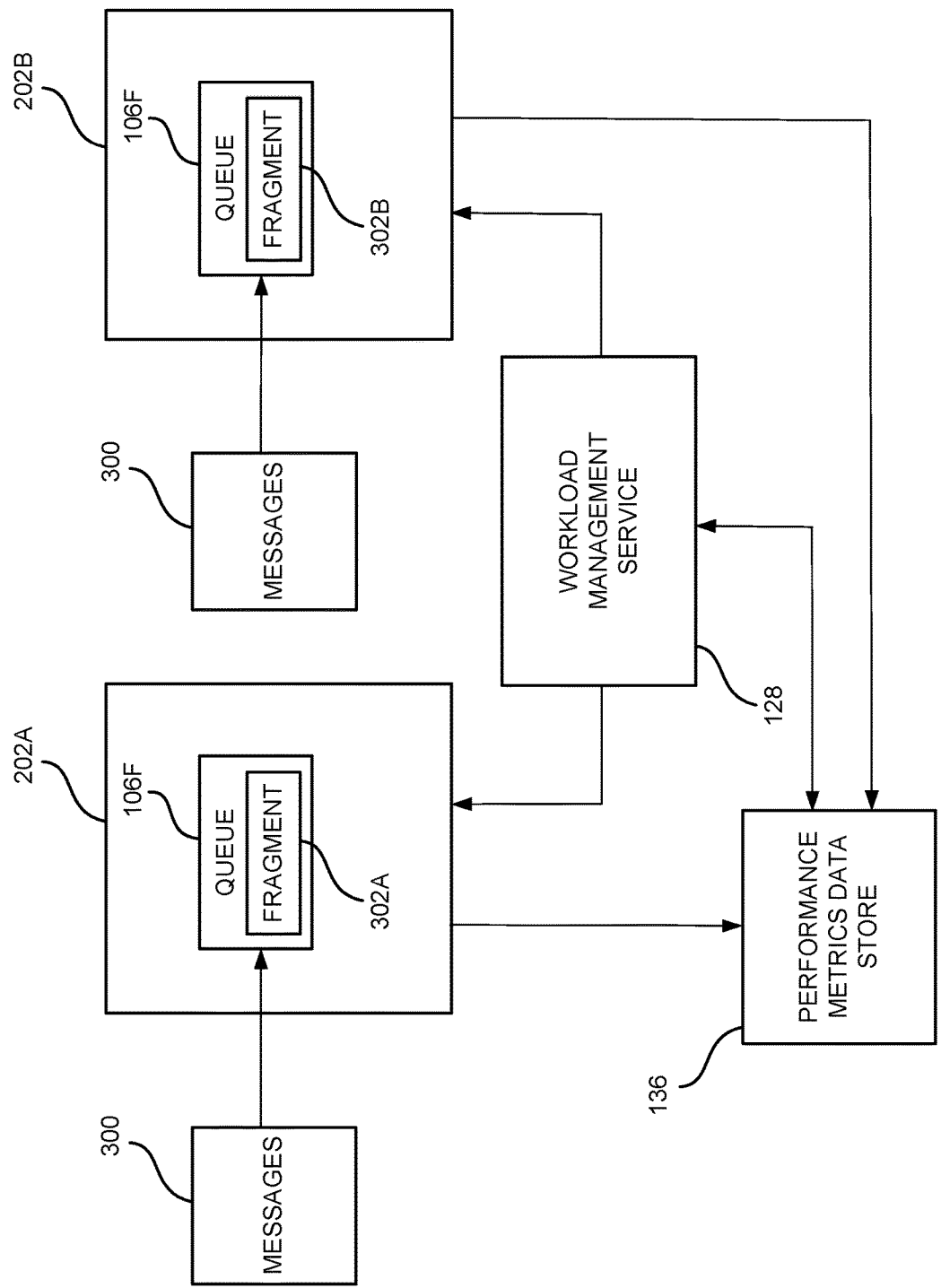
FIG. 3 schematically illustrates a configuration where FIFO queues within clusters include fragments, according to one configuration.

FIG. 3 schematically illustrates an example of FIFO queue fragments 302 for a particular FIFO queue 106F and how the FIFO queue fragments 302 can be used. In configurations, new messages 120 are appended to the last queue fragment 302A, e.g., tail fragment, of a FIFO queue 106F. The last queue fragment 302A is generally always writeable and is the only writeable FIFO queue fragment 302. As previously noted, the workload management service 128 of the service provider network 100 can detect or be informed that a cluster 202 is overloaded or about to become overloaded and decide to have messages directed from one or more FIFO queue fragments 302 on the affected cluster 202 to queue fragments 302 on some other less busy ("colder") cluster 202. Thus, in this example, the FIFO queue 106F includes the last writeable fragment 302A and is hosted on a first cluster 202A.

The workload management service 128 can decide to send new messages 120 to a new FIFO queue fragment 302B of a FIFO queue 106F at a second cluster 202B. The workload management service 128 can issue an API call sealing the FIFO queue fragment 302A of FIFO queue 106F for writes of new messages, e.g., "SealQueueForWrites(queue=202A, nextWriteableCluster=202B)" on the first cluster 202A.

After the SealQueueForWrites API call, all of the SendMessage(Batch) API calls for the FIFO queue 106F fragment 302A hosted on the first cluster 202A will start failing with an error. The error details might contain an API call "nextWriteableCluster=202B. The SendMessage(Batch) API calls can be retried for the FIFO queue 106F fragment 302B hosted on the second cluster 202B. Until the metadata is updated with new fragment 302B details, SendMessage (Batch) calls might suffer latency issues for failed attempts to send messages 120 to the first fragment 302A.

To achieve deduplication of sent messages 120, after a new Writeable fragment 302 is opened, until all deduplication buffers associated with the previously Writeable (and now SealedForWrites) fragments 302 are emptied, deduplication buffers associated with previous fragments 302 can be consulted to check if the message was not previously sent. This might mean additional latency for the duration of the deduplication time window. This issue might be addressed by migrating the now-immutable deduplication data to the new cluster 202/fragment 302 in the background to speed up the convergence of data.

As previously noted, messages 120 can be first read from the first fragment 302A of the FIFO queue 106F. If the first fragment 302A is already sealed for writes, this means that the first fragment 302A will eventually get drained of all messages 120 as it cannot accept any new messages 120. ReceiveRequest API calls are idempotent and retryable with respect to the FIFO queues 106F. Thus, in configurations, after the last message is deleted from a first fragment 302A of a FIFO queue 106F, the queue fragment 302A can be transactionally sealed for reads with an API call. After this takes place, no new ReceiveRequest API calls can be handled by the fragment 302A, but the cluster 202A that includes the fragment 302 can still decide whether the incoming ReceiveRequest API call is a repeat of a previously handled ReceiveRequest API call and respond accordingly. Messages 120 can now be read from the second fragment 302B at the cluster 202B.

In configurations, in order for the workload management service 128 to monitor and manage clusters 202 of hosts 130F for the queueing service 106, performance metrics are maintained by the performance metrics data store 136. The performance metrics can relate to, for example, enqueue rate, enqueue throughput, dequeue rate and queue size for the FIFO queues 106F at the various clusters 202 of hosts 130. The clusters 202 of hosts 130F can monitor themselves with respect to the performance metrics and report the performance metrics to the performance metrics data store 136.

As previously noted, when a cluster 202 becomes overloaded, or is about to become overloaded, based upon a workload threshold with respect to performance metrics, an alarm 132 is sent from the affected cluster 202 to the workload management service 128. In configurations, the workload management service 128 sends an acknowledgement 134 to the affected cluster 202 and stores the alarm 132 within the queue 128Q for processing. In configurations, performance metrics can be included with the alarm 128, as well as a list of top FIFO queue fragments 302 provided by the affected cluster 202 that may be a potential problem for the affected cluster 202.

In configurations, the workload management service 128 utilizes performance metrics obtained from the performance metrics data store 136 to determine available clusters 202 for placement of a new FIFO queue fragment 302. The performance metrics may be aggregated and a single workload value may be provided to, or generated by, the workload management service 128 for selecting a set of available clusters 202 for placement of the new queue fragment 302. The performance metrics may be aggregated utilizing a weighted scale if desired.

Once the workload management service 128 has determined a set of host clusters 302 that can be used for the placement of the new queue fragment 302, the workload management service 128 can select a host cluster 202 from the determined set. In configurations, the selected host cluster 202 is randomly selected from the determined set to prevent a single cluster 202 from being a target of too many queue movements or queue creations. The workload management service 128 can also utilize a similar process for establishing new FIFO queues 106F created by a user within the queueing service 106.

Examples of performance metrics include, but are not limited to, an enqueue rate, enqueue throughput, a dequeue rate and queue size. The enqueue rate and dequeue rate generally have units of number of receives and sends of messages 120 per host 130F per second, respectively. A weighted estimator with an exponential decay factor can be utilized if desired. Enqueue throughput has units of messages per second or size of messages per second. The queue size may be the actual size of a FIFO queue 106F on a host 130F.

Examples of situations in which a cluster 202 may be overloaded include the cluster 202 being overloaded by too high of an enqueue rate and/or dequeue rate of messages 120. In such a situation, the performance metric in either the send rate or the dequeue rate on a particular host 130F reaches a specified threshold of the hardware profile. The cluster 202 can sort its FIFO queues 106F by the corresponding metric and send the top FIFO queues 106F that may be the problem in the alarm 132. In configurations, the number of top queues may be determined by the cluster 202 based on total metric value and the performance metric values of the top queues.

The workload management service 128 can place the alarm 132 in its queue 128Q and acknowledges receipt of the alarm 132 to the cluster 202. The workload management service 128 then processes the alarm 132 as described for moving one of the top FIFO queues 106F from the affected cluster 202 to another cluster 202 by sealing head fragments 302 of the top queues 106F at the affected cluster 202 for writes and establishing tail fragments 302 at another cluster 202 for writes as previously described. In particular, the workload management service 128 can seal a head fragment 302 of the FIFO queue 106F for writes of messages 120 and place a tail fragment 302 of the FIFO queue 106F on the selected cluster 202 for writing of messages 120. The messages 120 can be written to the tail fragment 302 based upon the message group ID 120C.

Another example includes a particular FIFO queue 106F on a cluster 202 overloading the cluster 202 by too high of an enqueue rate or dequeue rate. An alarm 132 is sent to the workload management service 128 and identity of the problem FIFO queue 106F will be included within the alarm 132. In such a situation, the workload management service 128 may move the problem FIFO queue 106F as previously described by sealing a head fragment 302 for writes and establishing a new tail fragment 302 for writes at another cluster 202, or may move other FIFO queues 106F on the cluster 202 as previously described by sealing a head fragment 302 for writes and establishing a tail fragment 302 for writes at another cluster 202 to allow the cluster 202 to recover. This might also be done when the problem FIFO queue 106F already has multiple queue fragments 302 spread over multiple clusters 202.

In configurations, when a single FIFO queue 106F overloads a cluster 202 by reaching too high of a storage size, i.e., the number of messages being stored within the FIFO queue 106F exceeds a threshold, an alarm 132 may be sent to the workload management service 128 and the alarm 132 includes the identity of the problem FIFO queue 106F. The workload management service 128 can acknowledge the alarm 132 and place the alarm 132 within its queue 128Q. Once the workload management service 128 processes the alarm 132, the problem FIFO queue 128 can be moved to another cluster 202 as previously described by sealing a head fragment 302 for writes and establishing a tail fragment 302 for writes at another cluster 202. Alternatively, as previously noted, other FIFO queues 106F may be moved from the affected cluster 202 to a different cluster 202 as previously described by sealing a head fragment 302 for writes and establishing a tail fragment 302 for writes at another cluster 202 if the FIFO queue 106F already has too many fragments 302 spread over multiple clusters 202.

In configurations, if a FIFO queue 106F comprises multiple fragments 302, a current tail fragment 302 may be sealed for writes and a new tail fragment 302 for writes may be provided on another cluster 202. For example, a FIFO queue 106F may already have two fragments 302, where the first fragment 302 is a head fragment located on a first cluster 202 and the second fragment 302 is a tail fragment located on a second cluster 202. If the second cluster 202 is being overloaded and the second fragment 302 is causing the problems, the workload management service 128 may seal the second fragment 302 for writes, i.e. the current tail fragment is sealed for writes on the second cluster. The workload management service 128 may establish a new tail fragment 302 for writes on a new cluster 202. After this action, the FIFO queue 106F will have three fragments 302 distributed over three clusters 202—the head fragment 302 being on the first cluster, a middle fragment 302 on the second cluster, and the trail fragment 302 on the new cluster 302.

In configurations, clusters 202 may become overloaded because the workload management service 128 moves too many FIFO queue fragments 302 among the clusters or places too many newly created FIFO queues 106F on cluster 202. This may be an indication that there may not be enough clusters for handling of FIFO queues 106F and more resources may be needed for providing the queuing service 106.

It is to be appreciated that the examples given above are merely illustrative and that other techniques can be used in other configurations. Additional details regarding the arrangements shown in FIGS. 1-3 will be provided below with respect to FIG. 4.

Figure 4:
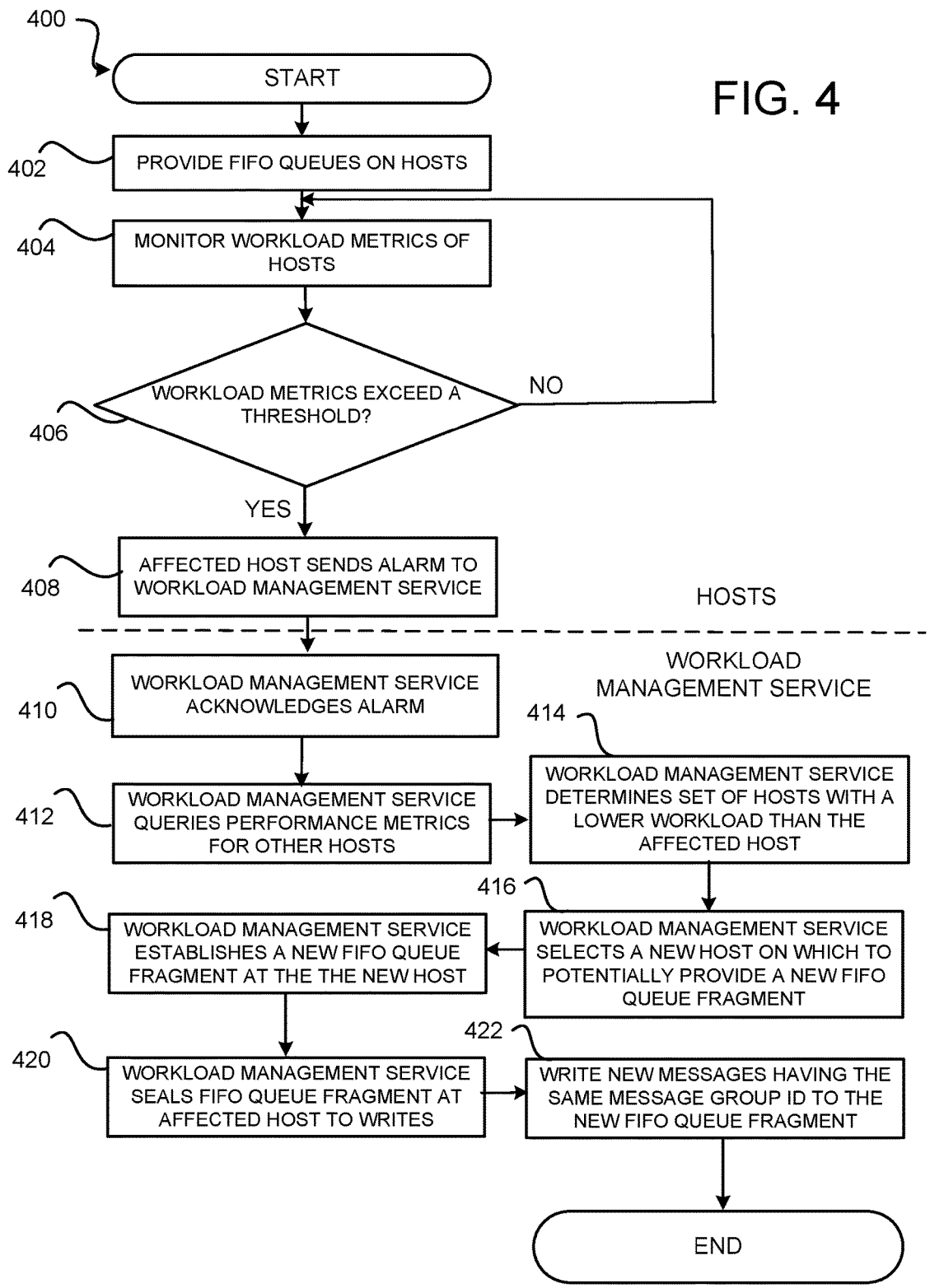
FIG. 4 is flow diagram showing a routine that illustrates aspects of moving a FIFO queue from one host to another host within the queuing service of the service provider network arrangements of FIGS. 1-3, according to one configuration.

FIG. 4 includes a flow diagram showing routine 400 that illustrates aspects of one mechanism for utilizing a workload management service, e.g., workload management service 128, to manage hosts, e.g., hosts 130F and clusters 202 of hosts 130, that provide FIFO queues, e.g., FIFO queues 106F, for message processing with the service provider network of FIGS. 1-3. It is to be appreciated that the logical operations described herein with respect to FIG. 4 (and the other FIGS.) can be implemented (1) as a sequence of computer implemented acts or program modules miming on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

Referring to FIG. 4, the routine 400 begins at operation 402, where FIFO queues are provided on hosts, e.g., hosts 130F or clusters 202 of hosts 130. At operation 404, the hosts monitor their workloads. The hosts can monitor various performance metrics such as enqueue rate, enqueue throughput, dequeue rate, queue size, etc.

From operation 404, the routine 400 continues to operation 406 where it is determined if a host exceeds a workload threshold based on one or more performance parameters. If no, then the routine 400 returns to operation 404 where the hosts continue to monitor themselves. If yes, then the routine proceeds to operation 408, where the affected host, i.e. the overloaded host, sends an alarm to the workload management service. The alarm may include, for example, performance parameters that are causing the alarm and/or top FIFO queues that may be the cause of the alarm. At operation 410, the workload management service acknowledges the alarm.

At operation 412, the workload management service queries performance metrics for other hosts. The workload management service may query the performance metrics data store 136 for the performance metrics. From operation 412, the routine 400 proceeds to operation 414, where the workload management service determines a set of hosts with a workload lower than the affected host based upon the performance metrics from the performance metrics data store 136.

From operation 414, the routine proceeds to operation 416, where the workload performance management service selects a new host from the determined set of hosts on which to potentially provide a new FIFO queue fragment. In configurations, the new host may be randomly selected from the determined set of hosts. In other configurations, the new host may be selected based upon how recently a FIFO queue has been placed, either moved or newly provided, thereon. At operation 418, the workload management service establishes a new FIFO queue fragment, e.g., a FIFO queue fragment 302, at the new host.

At operation 420, the workload management service seals a FIFO queue fragment of a FIFO queue at the affected host to writes to prevent new messages from being written to the FIFO queue fragment. At operation 422, new messages having the same message group ID, e.g., the message group ID 120C, as the messages that were being written at the now sealed FIFO queue fragment are written to the new FIFO queue fragment at the new host. From operation 422, the routine 400 proceeds to operation 424, where the routine 400 ends.

Figure 5:
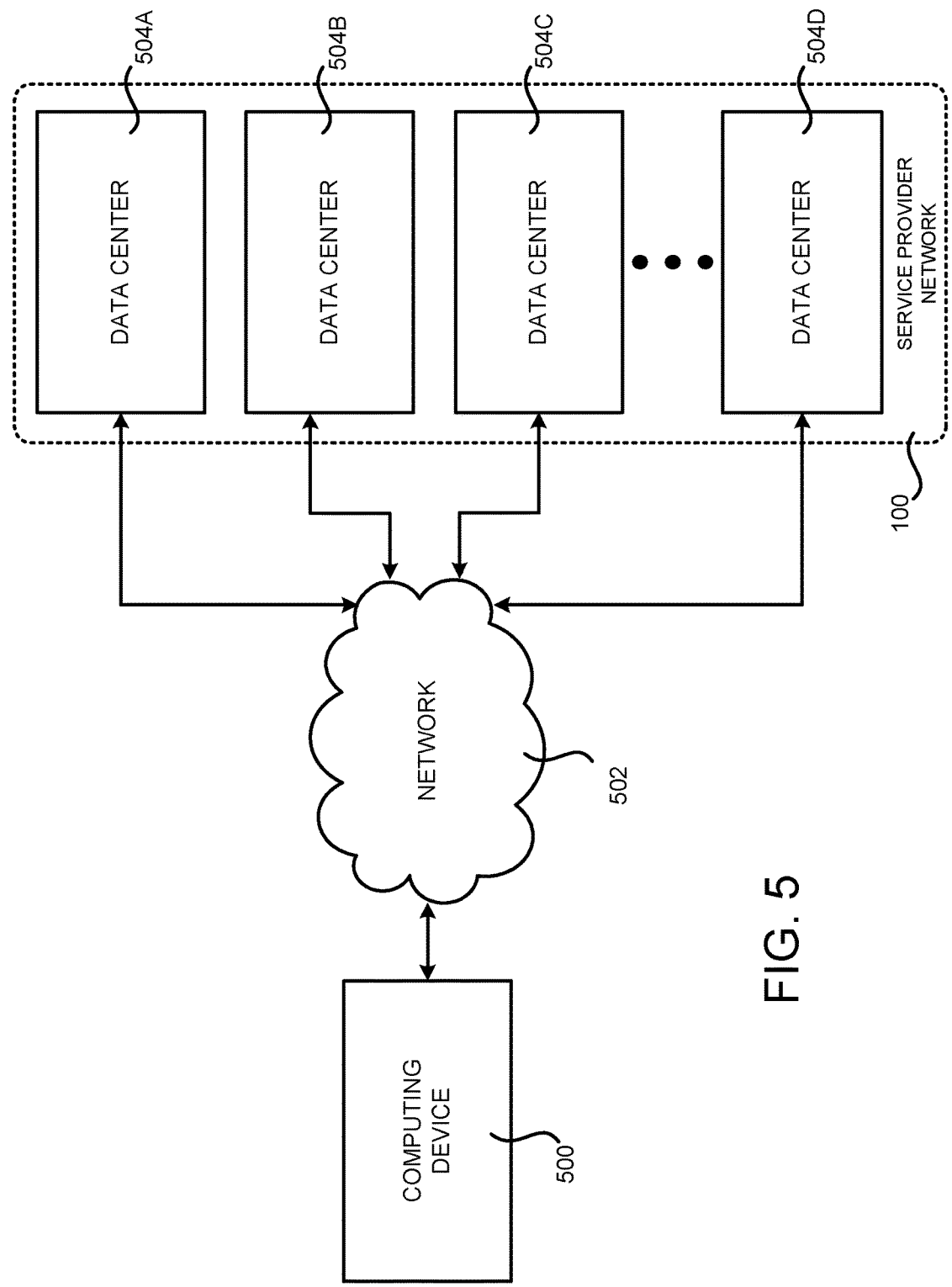
FIG. 5 is a system and network diagram that shows an illustrative operating environment that includes a service provider network that can be configured to implement aspects of the functionality described herein.

FIG. 5 is a system and network diagram that shows one illustrative operating environment for the configurations disclosed herein that includes a service provider network 100. As discussed above, the service provider network 100 can execute network services that provide computing resources on a permanent or an as-needed basis. Among other types of functionality, the computing resources provided by the service provider network 100 can be utilized to implement the various network services described herein. As also discussed above, the computing resources provided by the service provider network 100 can include various types of computing resources, such as data processing resources like VM instances, stateless event-driven compute services, data storage resources, networking resources, data communication resources, network services, and the like.

Each type of computing resource provided by the service provider network 100 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

As also discussed above, the computing resources provided by the service provider network 100 are enabled in one implementation by one or more data centers 504A-504D (which might be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

The customers and other users of the service provider network 100 can access the computing resources provided by the service provider network 100 over a network 502, which can be a wide area communication network ("WAN"), such as the Internet, an intranet or an Internet service provider ("ISP") network or a combination of such networks. For example, and without limitation, a computing device 500 operated by a customer or other user of the service provider network 100 can be utilized to access the service provider network 100 by way of the network 502. It should be appreciated that a local-area network ("LAN"), the Internet, or any other networking topology known in the art that connects the data centers 504 to remote customers and other users can be utilized. It should also be appreciated that combinations of such networks can also be utilized.

Figure 6:
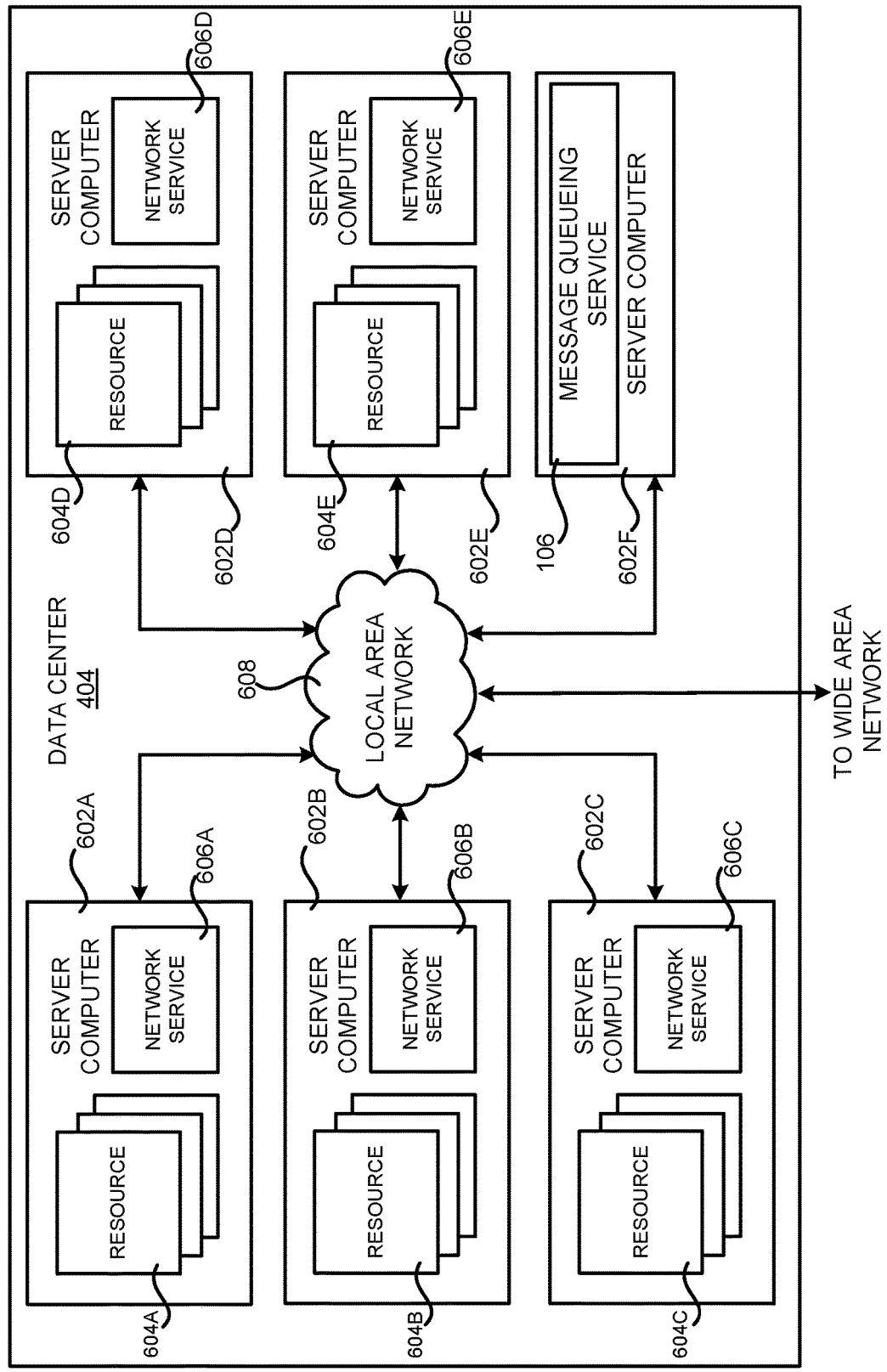
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing the computing resources 604A-604E.

The server computers 602 can be standard tower, rack-mount, or blade server computers configured appropriately for providing the computing resources 604 described herein (illustrated in FIG. 6 as the computing resources 604A-604E). As mentioned above, the computing resources 604 provided by the service provider network 100 can be data processing resources such as VM instances or hardware computing systems, data storage resources, database resources, networking resources, and others. Some of the servers 602 can also be configured to execute network services 606A-606E, respectively, capable of instantiating, providing and/or managing the computing resources 604, some of which are described in detail below with regard to FIG. 7.

The data center 504 shown in FIG. 6 also includes a server computer 602F that can execute some or all of the software components described above. For example, and without limitation, the server computer 602F can be configured to execute the message queuing service 106, which was described in detail above. The server computer 602F can also be configured to execute other components and/or to store data for providing some or all of the functionality described herein. In this regard, it should be appreciated that the message queuing service 106 can execute on many other physical or virtual servers in the data centers 504 in various configurations.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 504A-504D, between each of the server computers 602A-602F in each data center 504, and, potentially, between computing resources 604 in each of the data centers 504. It should be appreciated that the configuration of the data center 404 described with reference to FIG. 6 is merely illustrative and that other implementations can be utilized.

Figure 7:
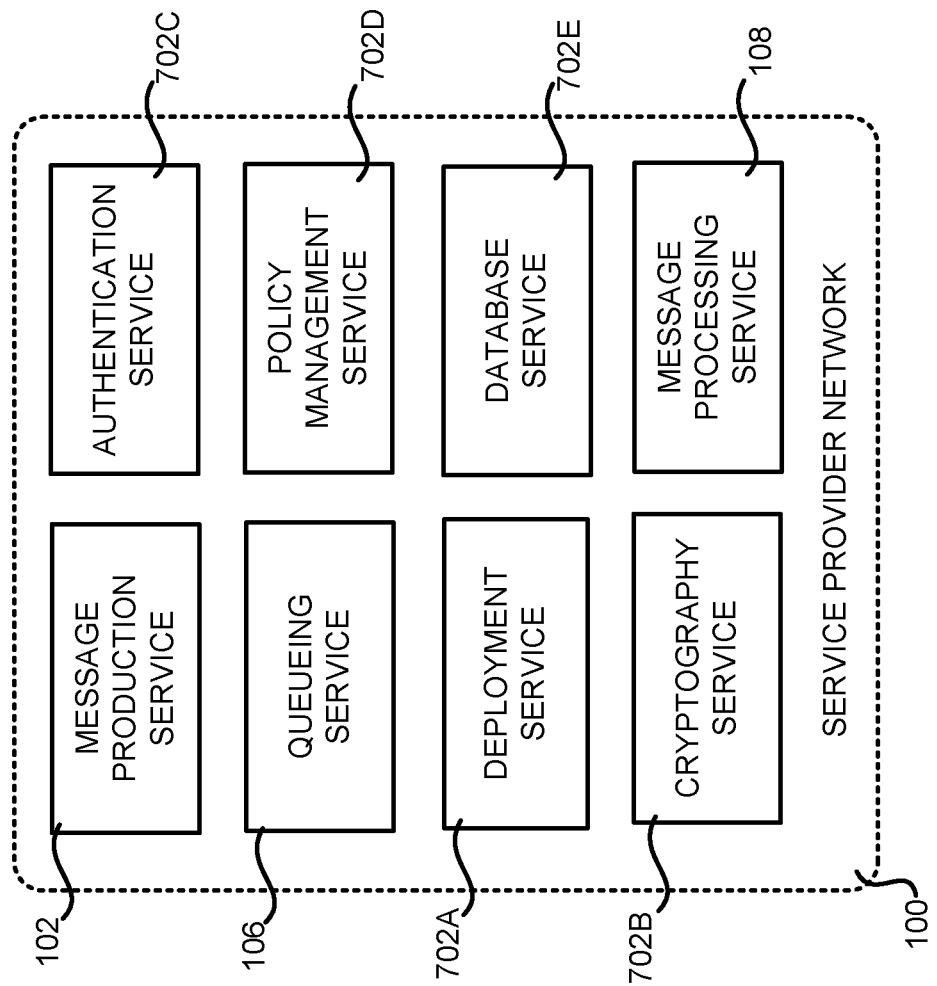
FIG. 7 is a network services diagram that shows aspects of several services that can be provided by and utilized within a service provider network configured to implement the various technologies disclosed herein.

FIG. 7 is a system and network diagram that shows aspects of several network services that can be provided by and utilized within the service provider network 100 in one configuration disclosed herein. In particular, and as discussed above, the service provider network 100 can provide a variety of network services to customers and other users of the service provider network 100 including, but not limited to, the message production service 102, the queueing service 106, and the message processing service 108. The service provider network 100 can also provide other types of services including, but not limited to, a deployment service 702A, a cryptography service 702B, an authentication service 702C, and/or a policy management service 702D, each of which is described in greater detail below. Additionally, the service provider network 100 can also provide other types of network services, some of which are also described in greater detail below.

It should be appreciated that customers of the service provider network 100 can include organizations or individuals that utilize some or all of the services provided by the service provider network 100. As described above, a customer or other user can communicate with the service provider network 100 through a network, such as the network 502 shown in FIG. 5. Communications from a customer computing device to the service provider network 100 can cause the services provided by the service provider network 100 to operate in accordance with the described configurations or variations thereof.

It is noted that not all configurations described include the services described with reference to FIG. 5 and that additional network services can be provided in addition to or as an alternative to the services explicitly described herein. Each of the services shown in FIG. 5 can also expose network service interfaces that enable a caller to submit appropriately configured application programming interface ("API") calls to the various services through network service requests. In addition, each of the services can include service interfaces that enable the services to access each other.

The service provider network 100 can also include a cryptography service 702B. The cryptography service 702B can utilize storage services of the service provider network 100 to store encryption keys in encrypted form, whereby the keys can be usable to decrypt customer keys accessible only to particular devices of the cryptography service 702B. The cryptography service 702B can also provide other types of functionality not specifically mentioned herein.

As illustrated in FIG. 7, the service provider network 100, in various configurations, also includes an authentication service 702C and a policy management service 702D. The authentication service 702C, in one example, is a computer system (i.e., collection of computing resources 704) configured to perform operations involved in authentication of users. For instance, one of the services shown in FIG. 7 can provide information from a user to the authentication service 702C to receive information in return that indicates whether or not the requests submitted by the user are authentic.

The policy management service 702D, in one example, is a network service configured to manage policies on behalf of customers or internal users of the service provider network 100. The policy management service 702D can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services based, at least in part, on the needs of its customers. For instance, the service provider network 100 can maintain a deployment service 702A for deploying program code and/or a database service 702E in some configurations. The database service 702E can be a collection of computing resources that collectively operate to create, maintain, and allow queries to be performed on databases stored within the service provider network 100. For example, a customer or other user of the service provider network 100 can operate and manage a database from the database service 702E by utilizing appropriately configured network API calls. This, in turn, can allow the customer to maintain and potentially scale the operations in the database. Other services include object-level archival data storage services, and services that manage, monitor, interact with, or support other services. The service provider network 100 can also be configured with other network services not specifically mentioned herein in other configurations.

Figure 8:
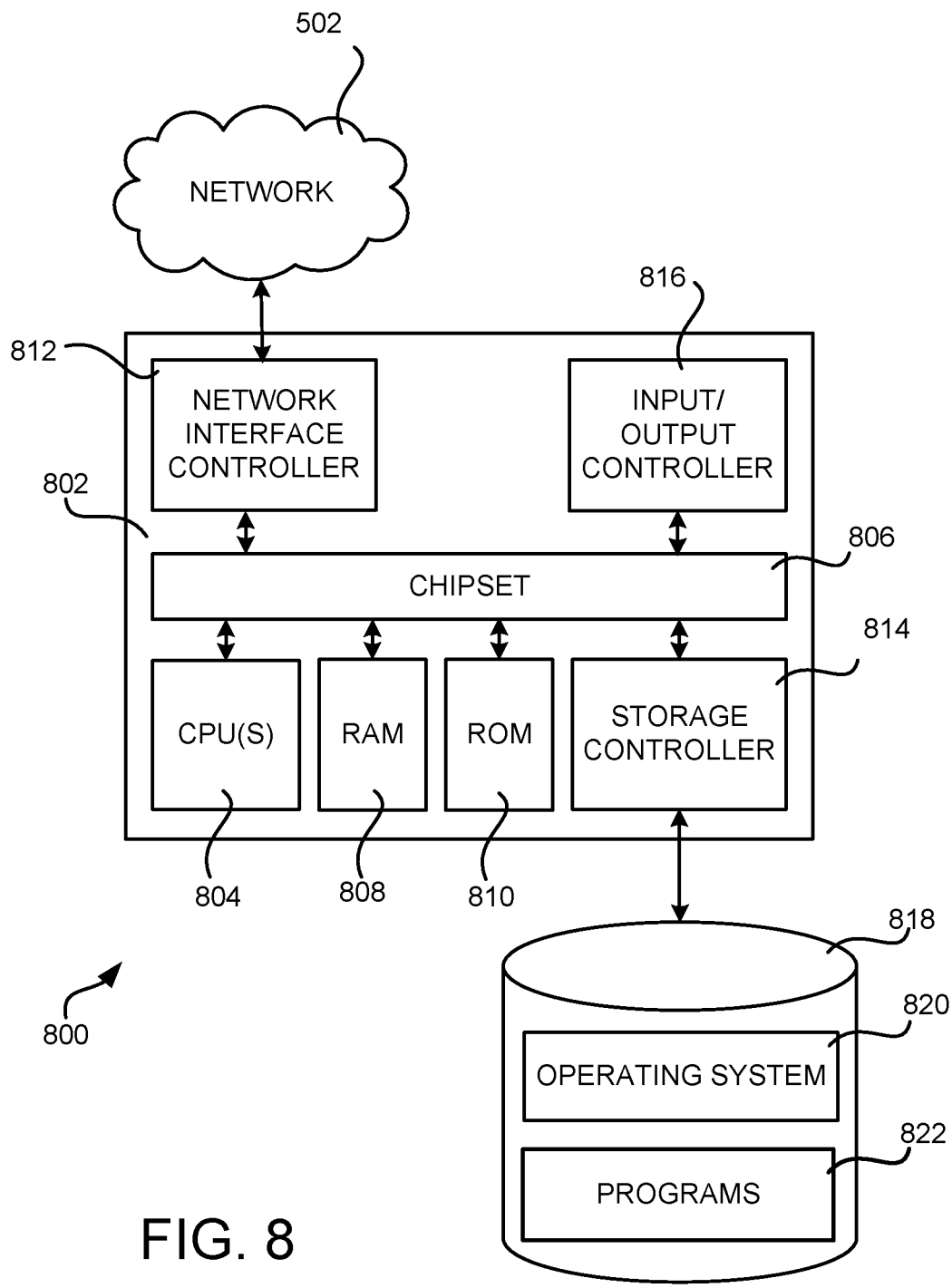
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 502 shown in FIG. 5. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-4. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or another type of output device. It will be appreciated that the computer 800 might not include all of the components shown in FIG. 8, can include other components that are not explicitly shown in FIG. 8, or might utilize an architecture completely different than that shown in FIG. 8.

Based on the foregoing, it should be appreciated that technologies for managing workloads of hosts providing FIFO queues in a messaging service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method within a service provider network, the computer-implemented method comprising:
   receiving an alarm from a first one or more hosts providing first-in, first-out (FIFO) queues;
   querying one or more performance metrics related to a plurality of other hosts providing FIFO queues;
   evaluating the one or more performance metrics to determine a set of other hosts from among the plurality of other hosts, the set of other hosts having workloads below a threshold;
   selecting, from the set of other hosts, a second one or more hosts;
   establishing a first FIFO queue fragment at the second one or more hosts for writing subsequent messages from a stream of messages to the first FIFO queue fragment at the second one or more hosts, the messages from the stream of messages comprising a first message group identifier;
   sealing a second FIFO queue fragment at the first one or more hosts for writing of messages from the stream of messages to the second FIFO queue fragment at the first one or more hosts; and
   based at least in part on the first message group identifier, processing, by a network-accessible message processing service provided by the service provider network, a message, wherein during processing of the message, the message and other messages that include the first message group identifier are inaccessible within the first FIFO queue fragment and the second FIFO queue fragment for retrieval from the first FIFO queue fragment and the second FIFO queue fragment by other network-accessible message processing services provided by the service provider network.

2. The computer-implemented method of claim 1, wherein the one or more performance metrics comprise a message enqueue rate, enqueue throughput, a message dequeue rate and a queue size.

3. The computer-implemented method of claim 1, wherein selecting, from the set of hosts, the second one or more hosts comprises randomly selecting, from the set of hosts, the second one or more hosts.

4. The computer-implemented method of claim 1, wherein the first one or more hosts comprises a first cluster of three or more hosts and the second one or more hosts comprises a second cluster of three or more hosts.

5. The computer-implemented method of claim 1, further comprising:
   selecting a third one or more hosts having a workload below the threshold;
   establishing a FIFO queue at the third one or more hosts for writing messages from another stream of messages to the FIFO queue, the another stream of messages comprising a second message group identifier.

6. A system for managing workloads of a plurality of hosts providing a network-accessible queuing service within a service provider network, the system comprising:
   one or more processors; and
   at least one computer-readable storage medium having computer-executable instructions stored thereupon which, when executed by the one or more processors, cause the system to:
      evaluate workloads of hosts other than a first one or more hosts to determine a set of hosts having workloads below a threshold;
      select, from the set of hosts, a second one or more hosts;
      establish a first first-in, first-out (FIFO) queue fragment at the second one or more hosts for writing subsequent messages from a stream of messages to the first FIFO queue fragment at the second one or more hosts, the messages from the stream of messages comprising a first message group identifier;
seal a second FIFO queue fragment at the first one or more hosts for writing of messages from the stream of messages at the second FIFO queue fragment at the first one or more hosts; and
based at least in part on the first message group identifier, process, by a network-accessible message processing service provided by the service provider network, a message, wherein during processing of the message, the message and other messages that include the first message group identifier are inaccessible within the first FIFO queue fragment and the second FIFO queue fragment for retrieval from the first FIFO queue fragment and the second FIFO queue fragment by other network-accessible message processing services provided by the service provider network.

7. The system of claim 6, wherein the computer-executable instructions, when executed by the one or more processors, further cause the system to:
query metrics related to the plurality of hosts; and
aggregate the metrics into scores related to workloads of the plurality of hosts.

8. The system of claim 7, wherein the computer-executable instructions, when executed by the one or more processors, further cause the system to evaluate workloads of hosts by evaluating the scores to determine the set of hosts other than the first one or more hosts having workloads below a threshold.

9. The system of claim 7, wherein the metrics comprise a message enqueue rate, enqueue throughput, a message dequeue rate and a queue size.

10. The system of claim 6, wherein the computer-executable instructions, when executed by the one or more processors, further cause the system to select, from the set of hosts, the second one or more hosts by randomly selecting, from the set of hosts, the second one or more hosts.

11. The system of claim 6, wherein the first one or more hosts comprises a first cluster of three or more hosts and the second one or more hosts comprises a second cluster of three or more hosts.

12. The system of claim 6, wherein the computer-executable instructions, when executed by the one or more processors, further cause the system to:
select a third one or more hosts having a workload below the threshold; and
establish a FIFO queue at the third one or more hosts for writing messages from another stream of messages to the FIFO queue at the third one or more hosts, the another stream of messages comprising a second message group identifier.

13. The system of claim 6, wherein the computer-executable instructions, when executed by the one or more processors, further cause the system to:
receive an alarm from the first one or more hosts that the first one or more hosts include one or more FIFO queues that are overloading a workload of the first one or more hosts; and
acknowledge the alarm to the first one or more hosts.

14. The system of claim 13, wherein the computer-executable instructions, when executed by the one or more processors, further cause the system to:
based upon metrics, determine which of the one or more FIFO queues are overloading the first one or more hosts;
seal one or more third FIFO queue fragments of the one or more FIFO queues for writing of messages from the stream of messages; and
establish one or more fourth FIFO queue fragments at the second one or more hosts for writing subsequent messages from the stream of messages.

15. A non-transitory computer-readable storage medium within a service provider network, the non-transitory computer-readable storage medium having computer-executable instructions stored thereupon which, when executed by one or more processors, cause the one or more processors to:
receive an alarm from a first one or more hosts that the first one or more hosts include one or more first first-in, first-out (FIFO) queues that are overloading the workload of the first one or more hosts;
evaluate workloads of hosts other than the first one or more hosts to determine a set of hosts having workloads below a threshold;
select, from the set of hosts, a second one or more hosts;
establish a first FIFO queue fragment at the second one or more hosts for writing subsequent messages from a stream of messages to the first FIFO queue fragment at the second one or more hosts, the stream of messages comprising a first message group identifier;
seal a second FIFO queue fragment at the first one or more hosts for writing of messages from the stream of messages at the second FIFO queue fragment at the first one or more hosts; and
based at least in part on the first message group identifier, process, by a network-accessible message processing service provided by the service provider network, a message, wherein during processing of the message, the message and other messages that include the first message group identifier are inaccessible within the first FIFO queue fragment and the second FIFO queue fragment for retrieval from the first FIFO queue fragment and the second FIFO queue fragment by other network-accessible message processing services provided by the service provider network.

16. The non-transitory computer-readable storage medium of claim 15, wherein the computer-executable instructions, when executed by the one or more processors, further cause the one or more processors to evaluate the workloads of hosts by evaluating performance metrics to determine the set of hosts other than the first one or more hosts having workloads below a threshold.

17. The non-transitory computer-readable storage medium of claim 16, wherein the performance metrics comprise a message enqueue rate, enqueue throughput, a message dequeue rate and a queue size.

18. The non-transitory computer-readable storage medium of claim 15, wherein the computer-executable instructions, when executed by the one or more processors, further cause the one or more processors to select, from the set of hosts, the second one or more hosts by randomly selecting, from the set of hosts, the second one or more hosts.

19. The non-transitory computer-readable storage medium of claim 15, wherein the computer-executable instructions, when executed by the one or more processors, further cause the one or more processors to:
select a third one or more hosts having a workload below the threshold; and
establish a FIFO queue at the third one or more hosts for writing messages from another stream of messages comprising a second message group identifier to the FIFO queue at the third one or more hosts.

20. The non-transitory computer-readable storage medium of claim 15, wherein the computer-executable instructions, when executed by the one or more processors, further cause the one or more processors to:
- based upon metrics, determine which of the one or more FIFO queues are overloading the first one or more hosts;
- seal one or more third FIFO queue fragments of the one or more FIFO queues for writing of messages, wherein the messages are from the stream of messages; and
- establish one or more fourth FIFO queue fragments at the one or more second hosts for writing subsequent messages from the stream of messages to the one or more FIFO queue fragments at the one or more second hosts.

* * * * *